US011415739B2

(12) United States Patent
Saijo

(10) Patent No.: US 11,415,739 B2
(45) Date of Patent: Aug. 16, 2022

(54) ILLUMINATING DEVICE COMPRISING A SYMBOL AND INPUT DEVICE COMPRISING THE SAME

(71) Applicant: ALPS ALPINE CO., LTD., Tokyo (JP)

(72) Inventor: Takayuki Saijo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/443,860

(22) Filed: Jul. 28, 2021

(65) Prior Publication Data
US 2021/0356644 A1 Nov. 18, 2021

Related U.S. Application Data

(63) Continuation of application No. PCT/JP2020/006367, filed on Feb. 18, 2020.

(30) Foreign Application Priority Data

Feb. 27, 2019 (JP) .............................. JP2019-033900

(51) Int. Cl.
F21V 8/00 (2006.01)
H01H 13/64 (2006.01)
H01H 13/02 (2006.01)

(52) U.S. Cl.
CPC ........... G02B 6/006 (2013.01); G02B 6/0051 (2013.01); G02B 6/0068 (2013.01);
(Continued)

(58) Field of Classification Search
CPC .... G02B 6/006; G02B 6/0068; G02B 6/0091; H01H 13/023; H01H 13/064; H01H 2219/056
See application file for complete search history.

(56) References Cited

U.S. PATENT DOCUMENTS 7,455,415 B2 11/2008 Miyahawa et al.
8,820,949 B2 9/2014 Takeda
(Continued)

FOREIGN PATENT DOCUMENTS

JP 2008-071630 3/2008
JP 2010-165663 7/2010
JP 2013-109877 6/2013

OTHER PUBLICATIONS

International Search Report for PCT/JP2020/006367 dated Apr. 21, 2020.

Primary Examiner — Keith G. Delahoussaye
(74) Attorney, Agent, or Firm — IPUSA, PLLC

(57) ABSTRACT

An illuminating device including a circuit board, a first light emitting member, a housing, a transparent support member, a light diffusing member, and a light guide member is provided. The first light emitting member is disposed on the top surface of the circuit board to emit light. The housing is disposed to cover the circuit board from above, and has a symbol configured to be illuminated by the light. The support member is disposed under the housing. A first surface of the support member is shaped to conform to the bottom surface of the housing and a second surface of the support member is flat. The light diffusing member has a side surface that receives the light, is fixed to the second surface of the support member, and diffuses the light toward the symbol. The light guide member guides the light to the side surface of the light diffusing member.

10 Claims, 12 Drawing Sheets

(52) U.S. Cl.
CPC ......... *G02B 6/0088* (2013.01); *G02B 6/0091* (2013.01); *H01H 13/023* (2013.01); *H01H 13/64* (2013.01); *H01H 2219/056* (2013.01)

(56) References Cited

U.S. PATENT DOCUMENTS

| | | | |
|---|---|---|---|
| 2008/0037277 A1* | 2/2008 | Yamaguchi | H01H 13/83 362/611 |
| 2012/0073941 A1* | 3/2012 | Chen | H01H 13/83 200/310 |

* cited by examiner

ILLUMINATING DEVICE COMPRISING A SYMBOL AND INPUT DEVICE COMPRISING THE SAME

CROSS-REFERENCE TO RELATED APPLICATIONS

This application is a continuation of International Application No. PCT/JP2020/006367, filed on Feb. 18, 2020 and designating the U.S., which claims priority to Japanese Patent Application No. 2019-033900, filed on Feb. 27, 2019. The contents of these applications are incorporated herein by reference in their entirety.

BACKGROUND OF THE INVENTION

1. Field of the Invention

The disclosures herein relate to an illuminating device and an input device.

2. Description of the Related Art

Illuminating devices that illuminate and display symbols, provided on the surface of a housing, by causing the symbols to be irradiated with light by a light emitting diode (LED) are known. As a device that utilizes such an illuminating device, there is a switch device that displays symbols corresponding to respective operations and provided on the surface of an operation member in an easily viewable manner by illuminating the symbols. Further, a thin pushbutton switch that uses a base sheet and a side-view LED to illuminate an operation surface is known. In the pushbutton switch, the LED emits light toward the side surface of the base sheet, and the light is guided through the base sheet and radiated from the top surface of the base sheet.

However, according to the related-art technology, the base sheet is typically flat because the light guiding properties of the base sheet may be significantly decreased if the base sheet is curved. Further, the operation surface provided with symbols, which are illuminated by light guided through the base sheet, is also flat along the base sheet. Therefore, in the case of a device having an illumination function using such a light guiding sheet, it may be difficult for the operation surface to have a three-dimensional shape, thus resulting in poor decorative appearance. In addition, such a device has a thin profile, which is often touted as one of the selling points. Because light needs to enter from the side surface of the light guiding sheet, a side-view LED is typically selected as a light source used with the light guiding sheet. As a result, the cost of parts may be increased.

RELATED-ART DOCUMENTS

Patent Documents

Patent Document 1: Japanese Laid-Open Patent Publication No. 2010-165663

SUMMARY OF THE INVENTION

It is an object of the present invention to provide a thin and low-cost illuminating device that includes an operation surface formed into a three-dimensional shape and having illuminated symbols, and to provide an input device that includes the illuminating device.

According to at least one embodiment, an illuminating device including a circuit board, a first light emitting member, a housing, a transparent support member, a light diffusing member, and a light guide member is provided. The circuit board has a top surface. The first light emitting member is disposed on the top surface of the circuit board to emit light. The housing has a bottom surface, is disposed to cover the circuit board from above, and has a symbol configured to be illuminated by the light. The support member is disposed under the housing. A first surface of the support member is shaped to conform to the bottom surface of the housing, and a second surface of the support member is flat. The light diffusing member has a side surface that receives the light, is fixed to the second surface of the support member, and is configured to diffuse the light toward the symbol. The light guide member is configured to guide the light, emitted from the first light emitting member, to the side surface of the light diffusing member.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
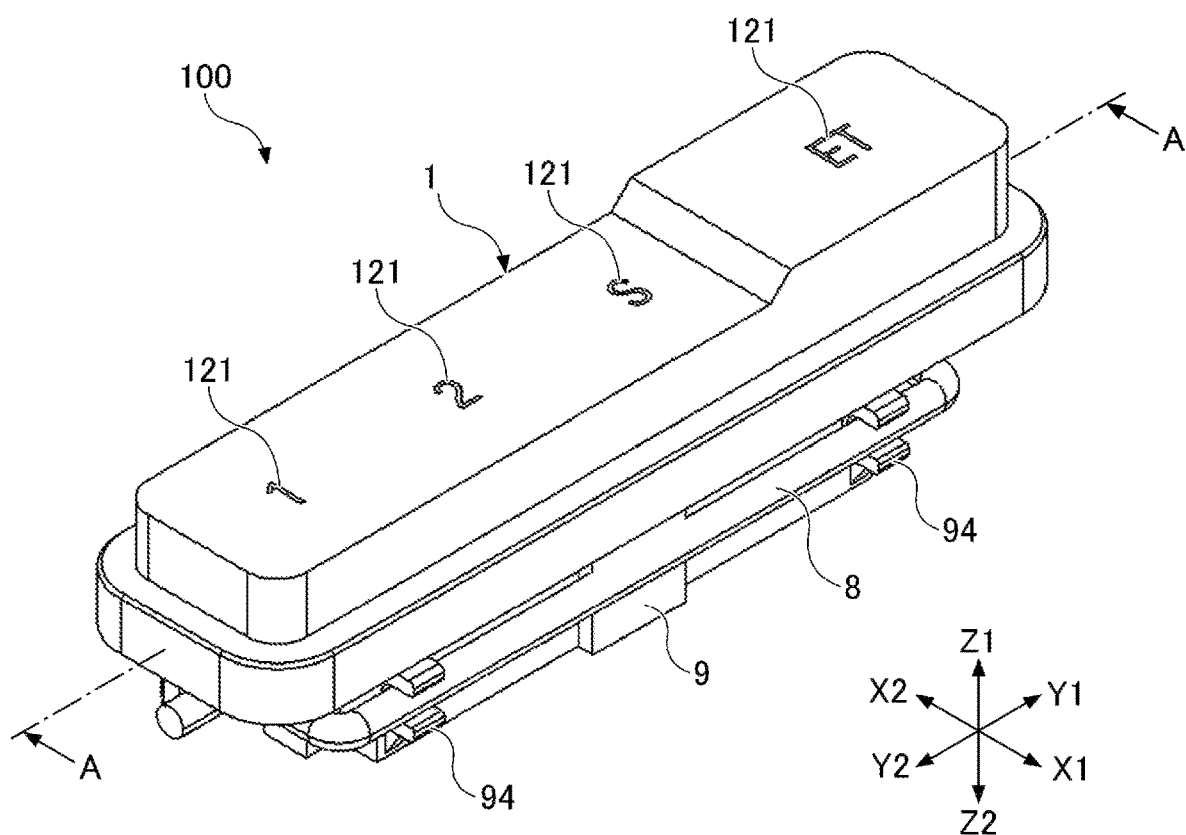
FIG. 1 is a perspective view of the exterior of a switch device.

According to at least one embodiment, a thin and low-cost illuminating device, that includes an operation surface formed into a three-dimensional shape and having illuminated symbols, and an input device that includes the illuminating device are provided.

In the following, embodiments of the present invention will be described in detail. In the specification and drawings, the same elements are denoted by the same reference numerals, and a duplicate description thereof will not be provided.

An illuminating device according to an embodiment will be described with reference to FIG. 1 through FIG. 15. The illuminating device according to the present embodiment includes a housing having symbols. The illuminating device is configured to illuminate and display the symbols by causing a built-in light emitting member to emit light to the symbols. The illuminating device according to the present embodiment can be applied to any device configured to illuminate and display symbols. For example, the illuminating device according to the present embodiment may be applied to an illuminating device configured to display a particular state (such as an on/off state, a normal/abnormal state, or an operating mode) by illuminating a symbol. Alternatively, the illuminating device according to the present embodiment may be applied to a switch device that includes an operation member (housing) having symbols corresponding to operations, and that is configured to display the symbols in an easily viewable manner by illuminating the symbols. However, the application of the illuminating device according to the present embodiment is not limited thereto.

In the following, the illuminating device according to the present embodiment will be described by taking a switch device 100 as an example. The switch device 100 is an example of an input device. The switch device 100 can be any switch device including an operation member and capable of controlling an object by operating the operation member. The operation of the operation member includes a pressing operation and a touch operation.

In the following, the switch device 100 will be described with reference to the directions (X1, X2, Y1, Y2, Z1, and Z2 directions) indicated in the drawings. The X1 and X2 directions are collectively referred to as an X direction, the Y1 and Y2 directions are collectively referred to as a Y direction, and the Z1 and Z2 directions are collectively referred to as a Z direction. The X direction, the Y direction, and the Z direction are perpendicular to each other. The Z1 direction and the Z2 direction may be referred to as an upper side and a lower side, respectively.

Figure 2:
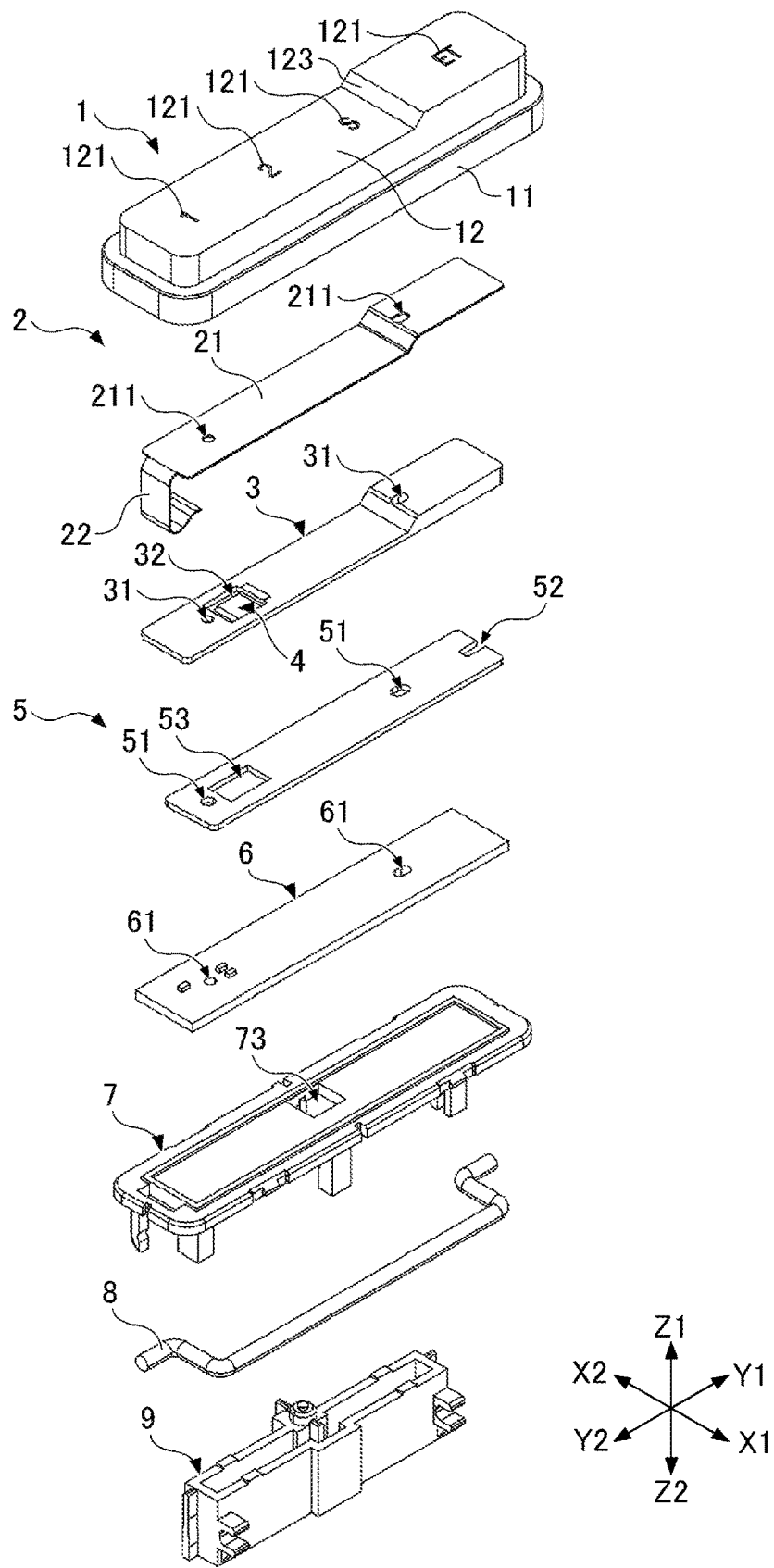
FIG. 2 is an exploded perspective view of the switch device of FIG. 1.
Figure 3:
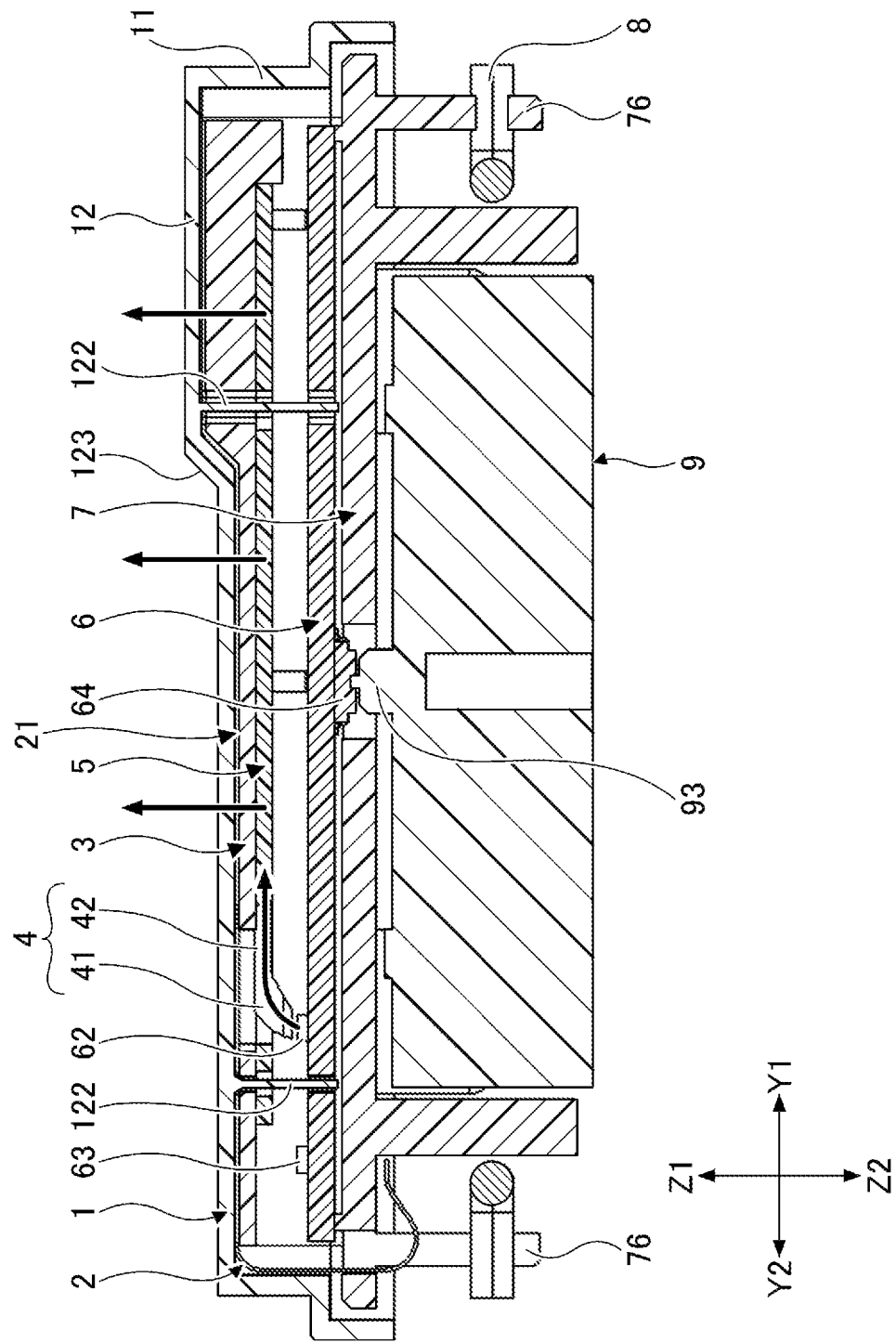
FIG. 3 is a cross-sectional view of the switch device taken through A-A of FIG. 1.
Figure 4:
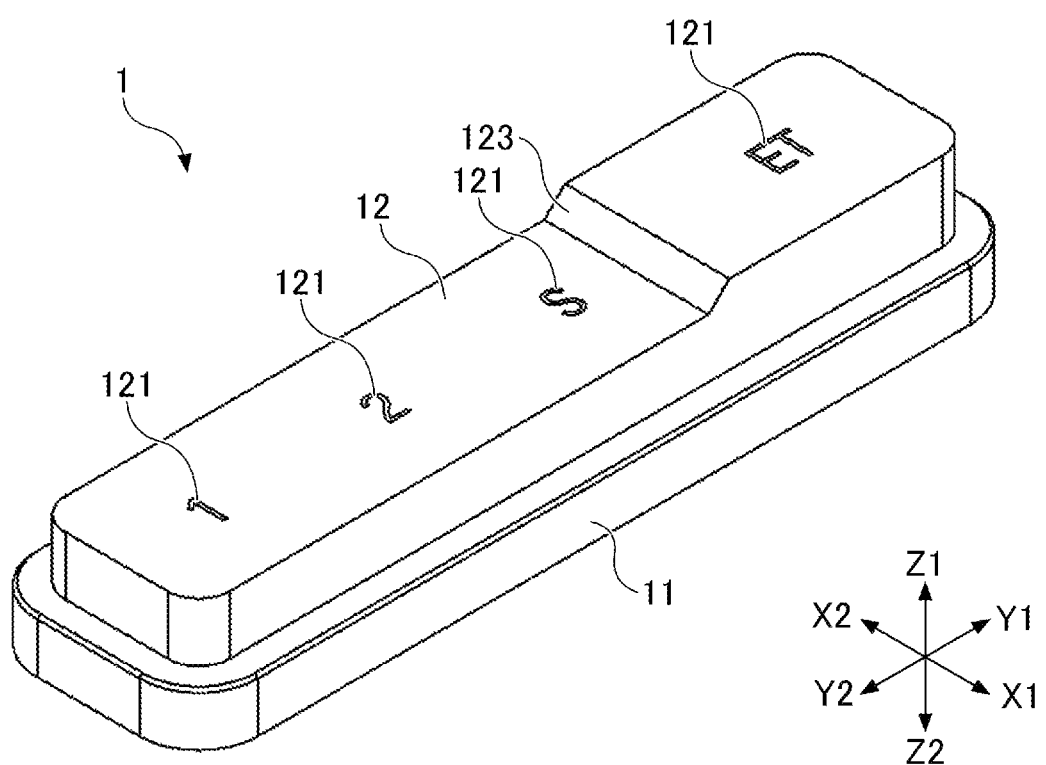
FIG. 4 is a perspective view of the exterior of an operation member viewed from the top.
Figure 5:
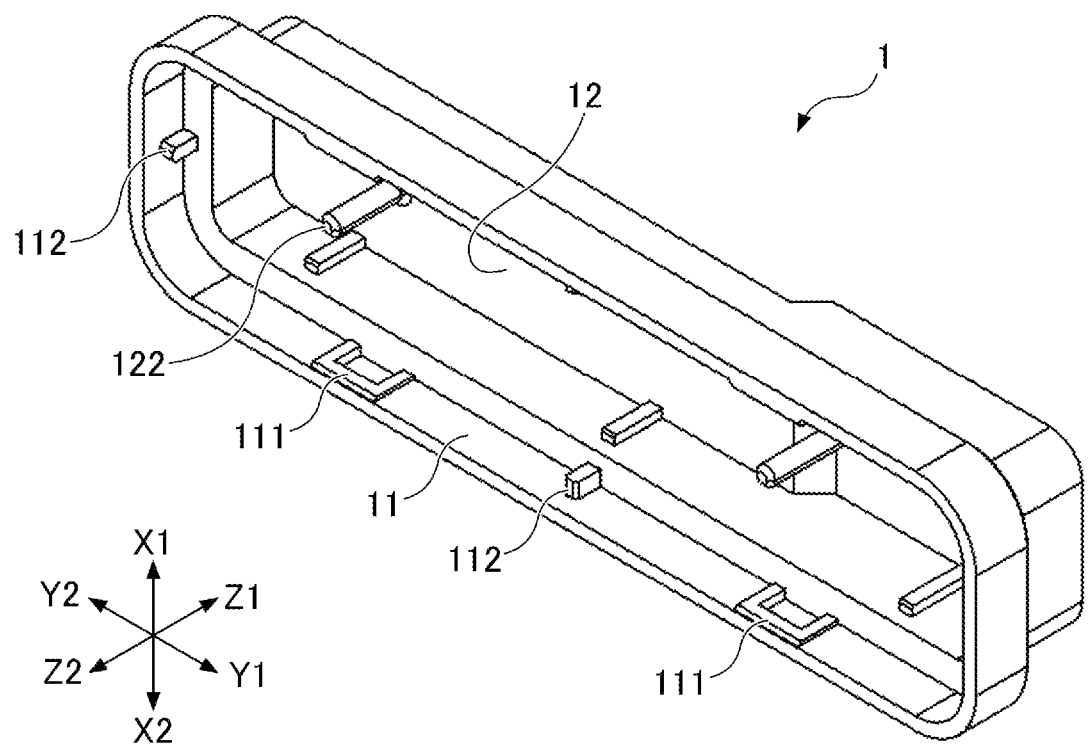
FIG. 5 is a perspective view of the exterior of the operation member viewed from the bottom.
Figure 6:
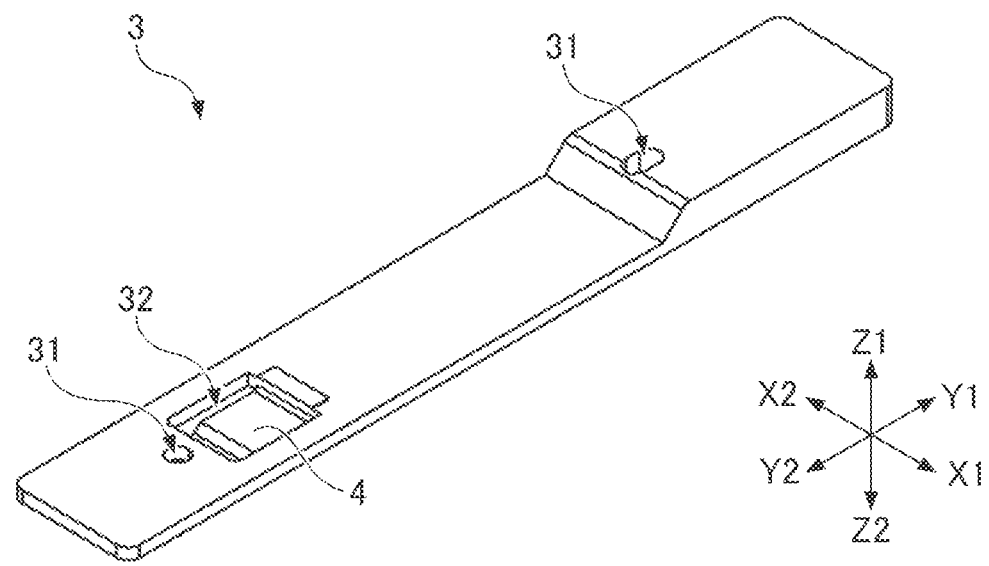
FIG. 6 is a perspective view of the exteriors of a support member and a light guide member viewed from the top.
Figure 7:
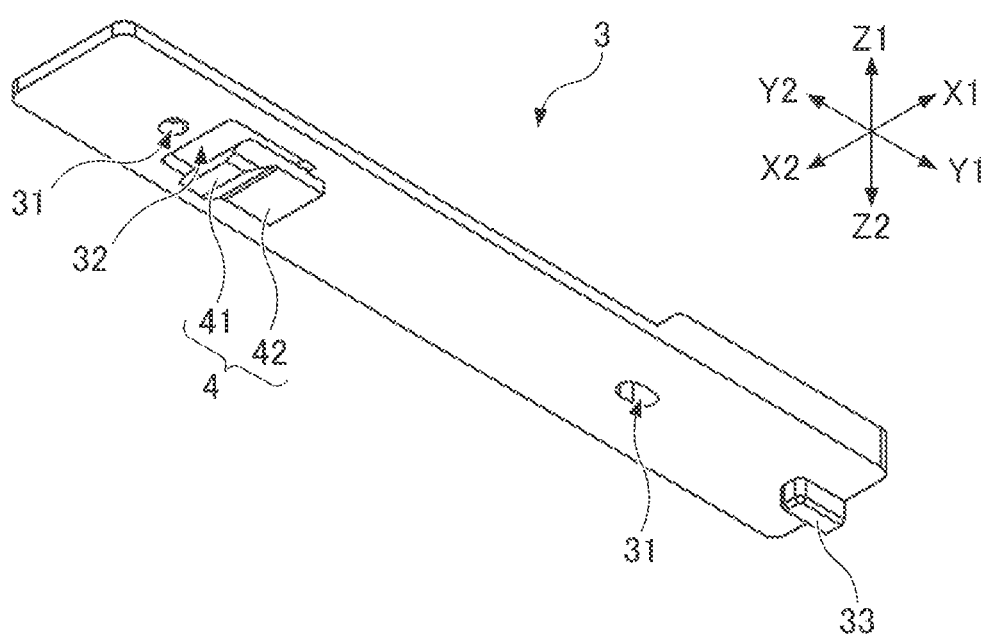
FIG. 7 is a perspective view of the exteriors of the support member and the light guide member viewed from the bottom.
Figure 8:
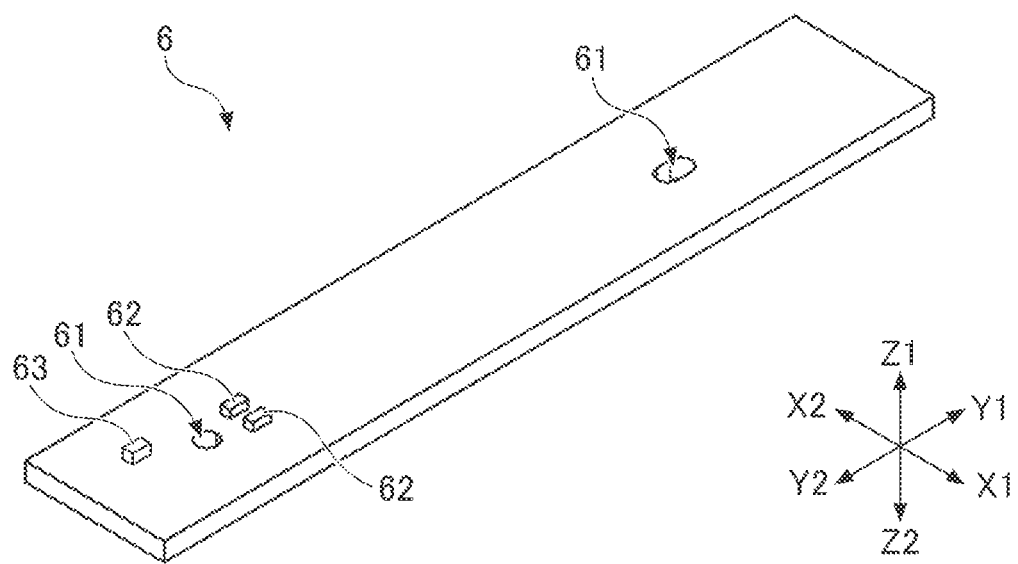
FIG. 8 is a perspective view of the exterior of a circuit board viewed from the top.
Figure 9:
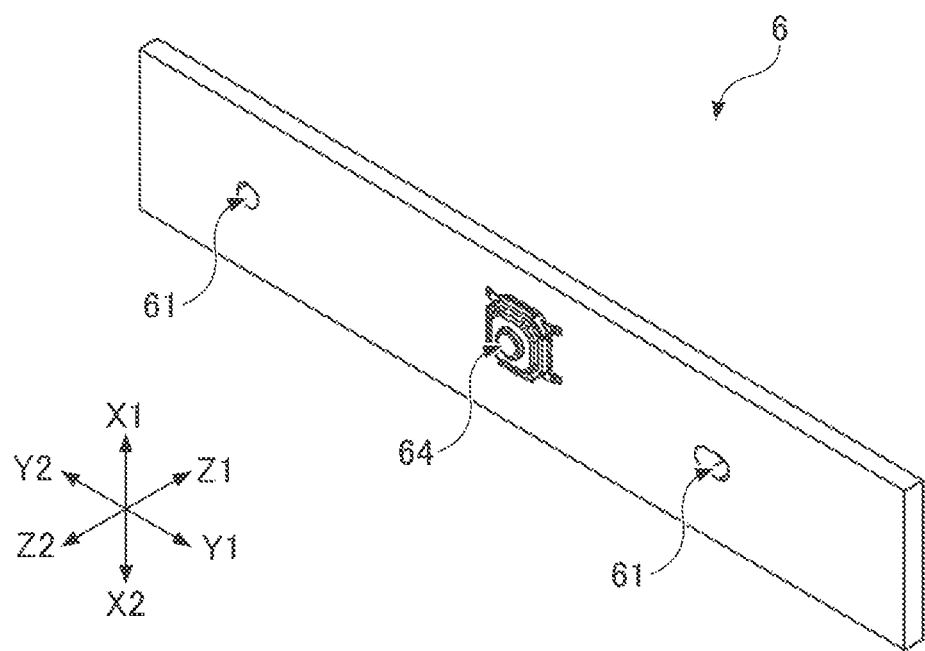
FIG. 9 is a perspective view of the exterior of the circuit board viewed from the bottom.
Figure 10:
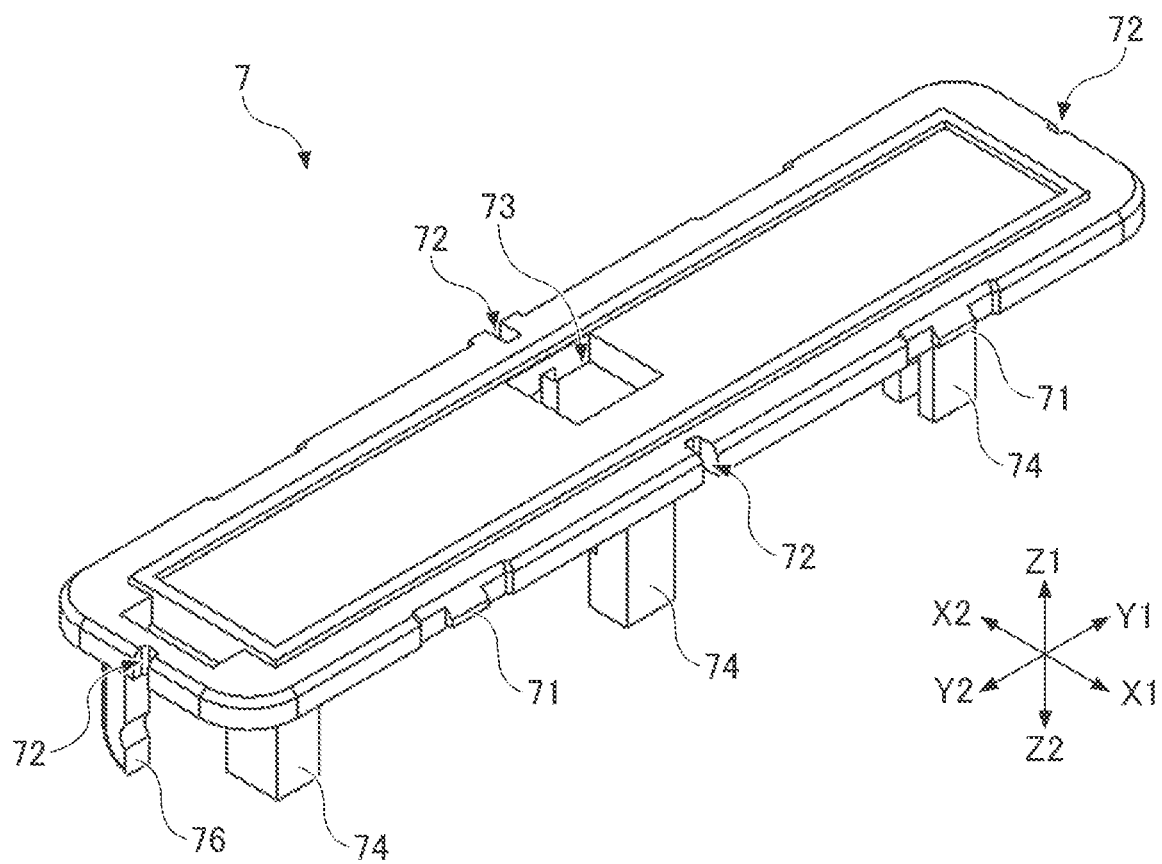
FIG. 10 is a perspective view of the exterior of a movable member viewed from the top.
Figure 11:
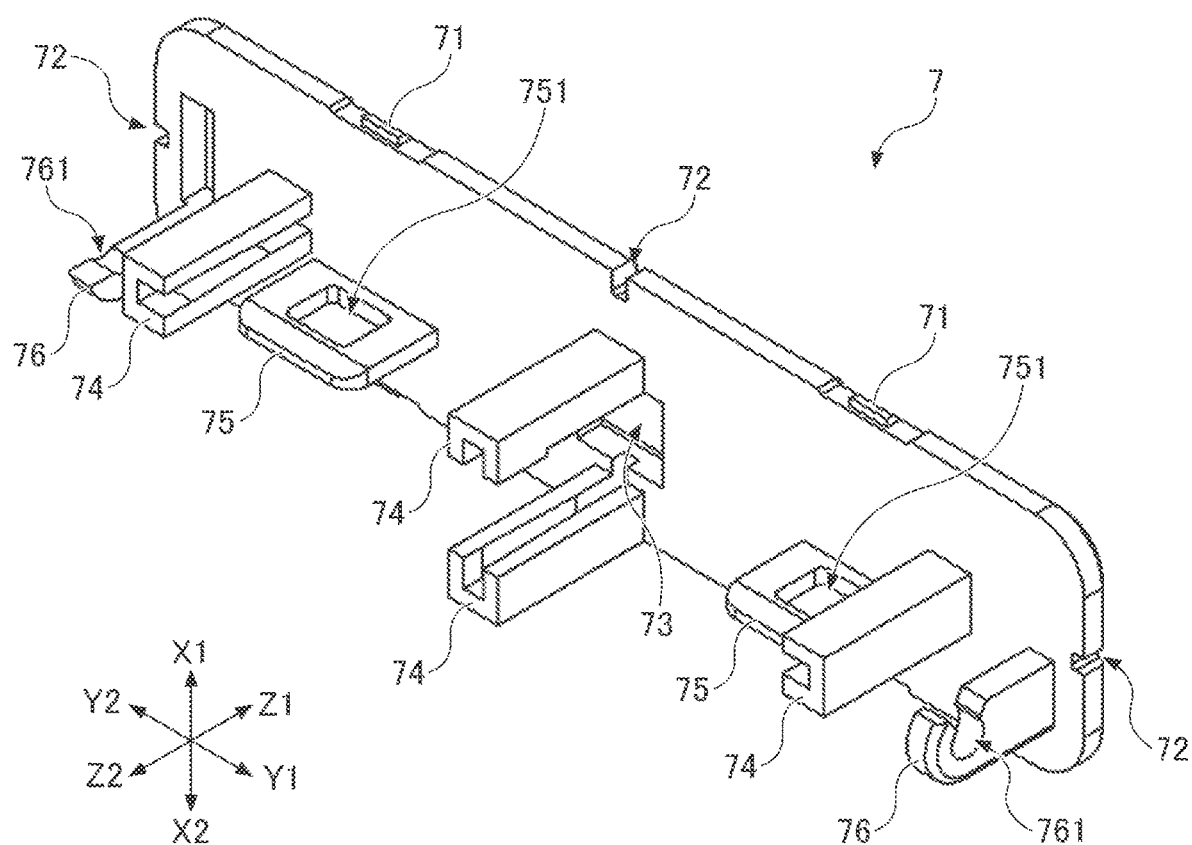
FIG. 11 is a perspective view of the exterior of the movable member viewed from the bottom.
Figure 12:
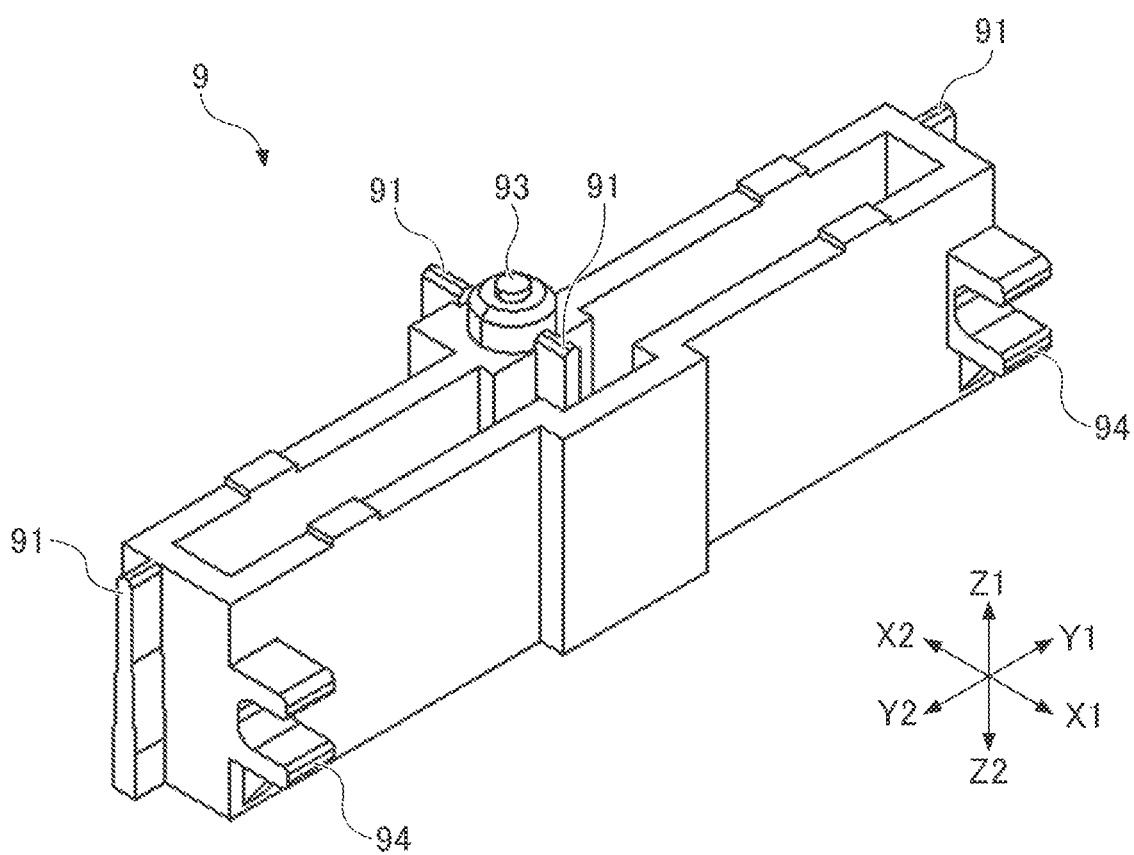
FIG. 12 is a perspective view of the exterior of a fixing member viewed from the top.
Figure 13:
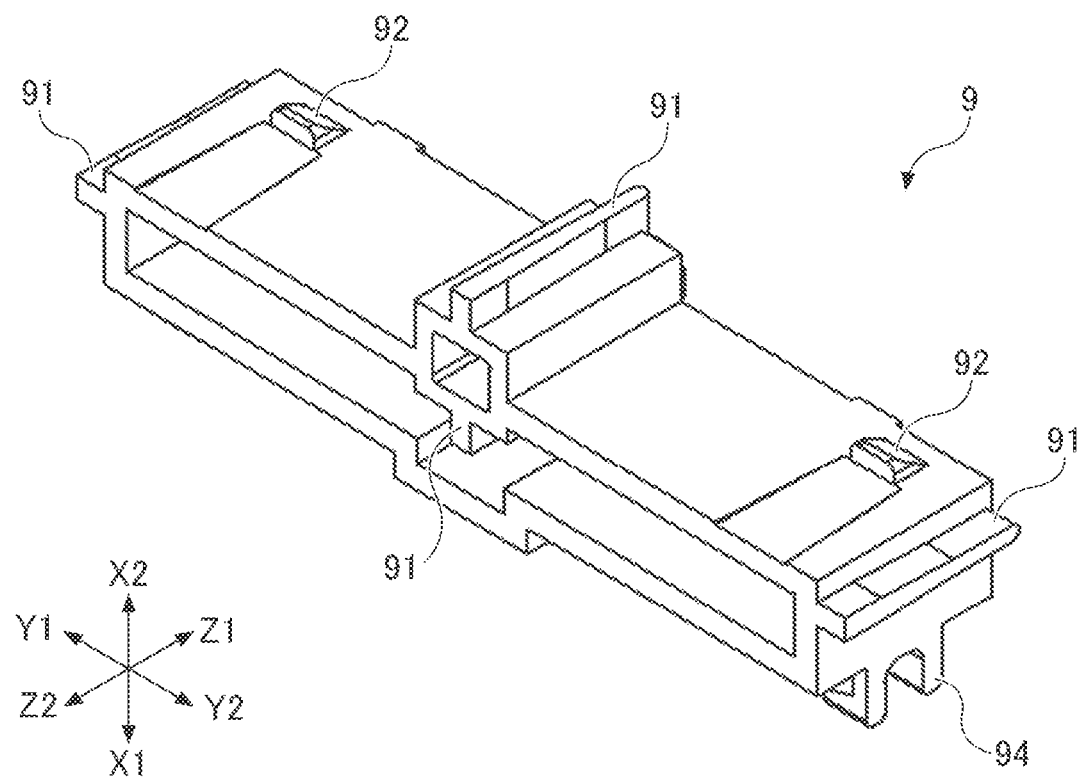
FIG. 13 is a perspective view of the exterior of the fixing member viewed from the bottom.
Figure 14:
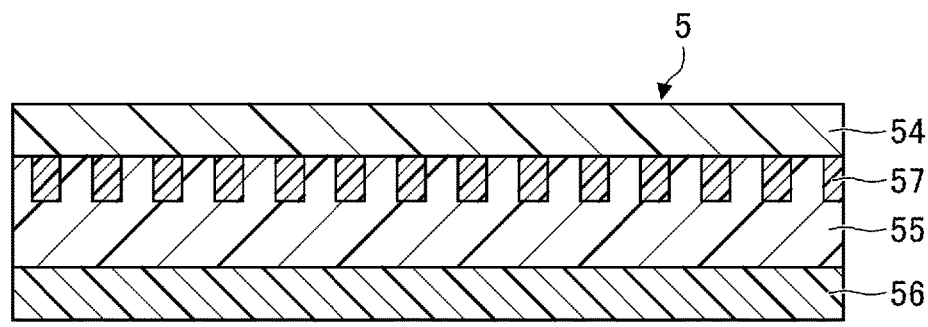
FIG. 14 is a diagram illustrating the structure of a light diffusing member.
Figure 14:
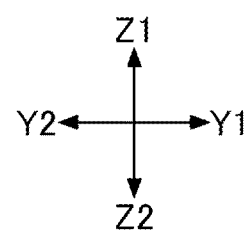
Figure 15:
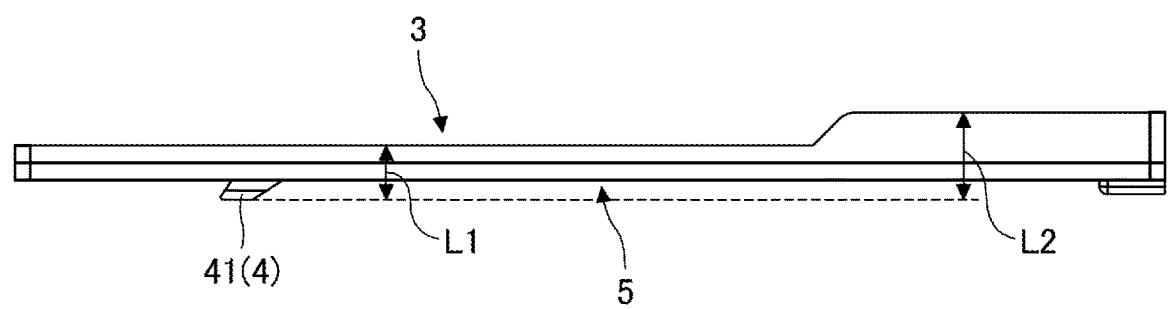
FIG. 15 is a diagram illustrating a partial assembly of the support member, the light guide member, and the light diffusing member.
Figure 15:
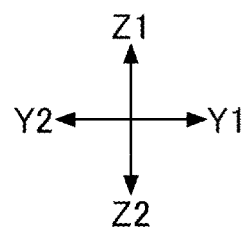

FIG. 1 is a perspective view of the exterior of the switch device 100. FIG. 2 is an exploded perspective view of the switch device 100 of FIG. 1. FIG. 3 is a cross-sectional view of the switch device 100 taken through A-A of FIG. 1. FIG. 4 is a perspective view of the exterior of an operation member 1 viewed from the top. FIG. 5 is a perspective view of the exterior of the operation member 1 viewed from the bottom. FIG. 6 is a perspective view of the exteriors of a support member 3 and a light guide member 4 viewed from the top. FIG. 7 is a perspective view of the exteriors of the support member 3 and the light guide member 4 viewed from the bottom. FIG. 8 is a perspective view of the exterior of a circuit board 6 viewed from the top. FIG. 9 is a perspective view of the exterior of the circuit board 6 viewed from the bottom. FIG. 10 is a perspective view of the exterior of a movable member 7 viewed from the top. FIG. 11 is a perspective view of the exterior of the movable member 7 viewed from the bottom. FIG. 12 is a perspective view of the exterior of a fixing member 9 viewed from the top. FIG. 13 is a perspective view of the exterior of the fixing member 9 viewed from the bottom. FIG. 14 is a diagram illustrating the structure of a light diffusing member 5. FIG. 15 is a diagram illustrating a partial assembly of the support member 3, the light guide member 4, and the light diffusing member 5.

The switch device 100 illustrated in FIG. 2 is an example of an input device that includes the illuminating device according to the present embodiment, and controls an object in response to a user's pressing operation. As illustrated in FIG. 2, the switch device 100 includes the operation member 1, a sensor member 2, the support member 3, the light guide member 4, the light diffusing member 5, the circuit board 6, the movable member 7, an elastic member 8, and the fixing member 9.

The operation member 1 is operated by the user. The operation member 1 serves as a housing of the illuminating device according to the present embodiment. The material of the operation member 1 may be polycarbonate (PC) or acrylonitrile butadiene styrene (ABS), but is not limited thereto.

As illustrated in FIG. 4 and FIG. 5, the operation member 1 has an approximately rectangular parallelepiped shape that has an opening at the bottom and that extends in the Y direction. Symbols 121, which will be described later, of the operation member 1 are formed of a transparent material, and the operation member 1 other than the symbols 121 is formed of a non-transparent material. The operation member 1 may be formed of a transparent material or may be formed of a non-transparent material. In the former case, the operation member 1 other than the symbols 121 may be painted so as not to be transparent. In the latter case, the symbols 121 may be formed to be thin so as to be transparent. As used herein, the term "transparent" means that light emitted from light emitting members 62 is transmitted so as to be viewable by the user. The operation member 1 includes a side plate 11 and a top plate 12.

The side plate 11 constitutes the side surfaces of the operation member 1. As illustrated in FIG. 5, the side plate 11 includes a plurality of fitting portions 111 and a plurality of positioning protrusions 112.

The fitting portions 111 are projections formed on the inner peripheral surface of the side plate 11 and the center portions of the fitting portions 111 are recessed. The plurality of fitting portions 111 are formed at positions corresponding to a plurality of projections 71 (see FIG. 10) of the movable member 7. The projections 71 are fitted into the center portions of the fitting portions 111, thereby fixing the operation member 1 to the movable member 7.

The positioning protrusions 112 are projections that project from the inner peripheral surface of the side plate 11. The plurality of positioning protrusions 112 are formed at positions corresponding to a plurality of grooves 72 (see FIG. 10) of the movable member 7. The positioning protrusions 112 are inserted into the grooves 72, thereby positioning the operation member 1 with respect to the movable member 7.

The top plate 12 constitutes the top surface of the operation member 1, and is disposed to cover the circuit board 6 from above. In the example of FIG. 4, the top plate 12 has a stepped shape in which the Y1 side of the top plate 12 is higher than the Y2 side of the top plate 12; however, the shape of the top plate 12 is not limited thereto. For example, the entirety of the top plate 12 may be flat, the top plate 12 may have a shape with two or more steps, or at least a part of the top plate 12 may be curved. The top plate 12 may have any shape that can cover the circuit board 6 from above. As illustrated in FIG. 4 and FIG. 5, the top plate 12 includes the plurality of symbols 121, a plurality of positioning protrusions 122, and a step 123.

Each of the symbols 121 is a transparent portion that corresponds to an operation detail of the operation member 1. Symbols 121 are irradiated with light from below by the light emitting members 62, and part of the light is transmitted through the symbols 121. Accordingly, the user can visibly recognize that the symbols 121 are illuminated.

In the example of FIG. 4, the four symbols 121 are arranged at equal intervals in the Y direction; however, the number and the arrangement of the symbols 121 are not limited thereto. The top plate 12 may have one or more symbols 121 at any positions.

Further, In the example of FIG. 4, the four symbols 121 have "1", "2", "S", and "ET" shapes; however, the shapes of the four symbols 121 are not limited thereto. The symbols 121 can be any symbols such as numbers, letters, marks, or figures.

Further, In the example of FIG. 4, the symbols 121 correspond to the details of operations performed when the symbols 121 are pressed. If the illuminating device according to the embodiment is an illuminating device that displays a particular state, a symbol 121 may be formed into a shape that represents the particular state.

The positioning protrusions 122 are rod-shaped portions that extend downward from the bottom surface of the top plate 12. The plurality of positioning protrusions 122 are formed at positions corresponding to a plurality of through-holes 211 of the sensor member 2, a plurality of through-holes 31 of the support member 3, a plurality of through-holes 51 of the light diffusing member 5, and a plurality of through-holes 61 of the circuit board 6 (see FIG. 2). The positioning protrusions 122 are inserted into the through-holes 211, 31, 51, and 61, thereby positioning the sensor member 2, the support member 3, the light diffusing member 5, and the circuit board 6 with respect to the top plate 12.

The step 123 is a part of the top plate 12, and connects the Y1 side of the top plate 12 to the Y2 side of top plate 12 such that the position of the top plate 12 in the Z-direction differs between the Y1 side and the Y2 side. The step 123 forms a stepped shape of the top plate 12. The top plate 12 may have an N number of steps 123.

Note that the configuration of the operation member 1 is not limited to the above-described configuration. For example, the operation member 1 does not necessarily include at least one of the fitting portions 111, the positioning protrusions 112, and the positioning protrusions 122. As used herein, the phrase "at least one of A and B" includes any one of "A", "B", and "A and B". The operation member 1 may have any configuration that includes at least one symbol and can be operated by the user.

The sensor member 2 is a sensor that is transparent, that has a sheet shape, and that is configured to detect the contact position of the user. The sensor member 2 may be, for example, an electrostatic sensor, but is not limited thereto. The sensor member 2 may be any sensor capable of detecting the contact position of the user. As illustrated in FIG. 2, the sensor member 2 includes a sensor 21 and a connection terminal 22.

The sensor 21 is transparent, has a sheet shape, and is equipped with a sensor function. As illustrated in FIG. 3, the sensor 21 is disposed between the operation member 1 and the support member 3. More specifically, the top surface of the sensor 21 faces the bottom surface of the top plate 12 of the operation member 1, and the bottom surface of the sensor 21 faces the top surface of the support member 3. As will be described later, the sensor 21 is held in contact with the bottom surface of the top plate 12. The sensor 21 is shaped to conform to the top plate 12, and covers at least the symbols 121 from below. Further, as illustrated in FIG. 2, the sensor 21 includes the plurality of through-holes 211.

The plurality of through-holes 211 are formed at positions corresponding to the plurality of positioning protrusions 122 of the top plate 12, and extend in the Z direction. As described above, the positioning protrusions 122 are inserted into the through-holes 211 of the sensor member 2, thereby positioning the sensor member 2 with respect to the top plate 12.

The connection terminal 22 connects the sensor 21 to the circuit board 6. The connection terminal 22 may be transparent, but is not necessarily transparent. In the example of FIG. 2, the connection terminal 22 has a sheet shape that extends from the Y2 side of the sensor 21. However, the position and the shape of the connection terminal 22 are not limited thereto.

Upon a user contacting the top plate 12 of the operation member 1, the sensor 21 detects the contact position of the user, and outputs the detected result (contact position). The detected result, output from the sensor 21, is input into the circuit board 6 via the connection terminal 22. Accordingly, the circuit board 6 can obtain the contact position of the user on the top plate 12, and identify a symbol 121 contacted by the user based on the obtained contact position.

Note that the configuration of the sensor member 2 is not limited to the above-described configuration. The sensor member 2 can have any configuration as long as the sensor member 2 is transparent, has a sheet shape, and is capable of detecting the contact position of the user.

The support member 3 is a transparent member that supports the sensor member 2 from below. The material of the support member 3 may be, for example, PC, but is not limited thereto. As illustrated in FIG. 6 and FIG. 7, the support member 3 has an approximately rectangular plate shape that extends in the Y direction. The top surface of the support member 3 is shaped to conform to the bottom surface of the top plate 12, and the bottom surface of the support member 3 is flat. In the present embodiment, the top plate 12 has a stepped shape in which the Y1 side of the top plate 12 is higher than the Y2 side of the top plate 12. Therefore, the top surface of the support member 3 has a stepped shape in which the Y1 side of the support member 3 is higher than the Y2 side of the support member 3 and that matches the stepped shape of the top plate 12.

As illustrated in FIG. 3, the support member 3 is disposed between the sensor member 2 and the light diffusing member 5. More specifically, the support member 3 is disposed such that the top surface of the support member 3 faces the bottom surface of the sensor member 2, and the bottom surface of the support member 3 faces the top surface of the light diffusing member 5. Because the support member 3, whose top surface is shaped to conform to the bottom surface of the top plate 12, supports the sensor member 2 from below, the sheet-shaped sensor member 2 (the sensor 21) can be held in contact with the bottom surface of the top plate 12. Accordingly, the detection accuracy of the sensor member 2 can be improved. As illustrated in FIG. 6 and FIG. 7, the support member 3 includes the plurality of through-holes 31, an opening portion 32, and the positioning protrusion 33.

The plurality of through-holes 31 are formed at positions corresponding to the plurality of positioning protrusions 122 of the top plate 12, and extend in the Z direction. As described above, the positioning protrusions 122 are inserted into the through-holes 31, thereby positioning the support member 3 with respect to the top plate 12.

The opening portion 32 is formed over the light guide member 4. The opening portion 32 is formed at a position shifted from the positions of the symbols 121 (that is, the opening portion 32 is not formed directly below the symbols 121). As will be described later, the opening portion 32 allows the light guide member 4 to be readily fixed to the support member 3.

The positioning protrusion 33 is a projection that projects from the end portion on the Y1 side of the bottom surface of the support member 3. The positioning protrusion 33 is formed at a position corresponding to a groove 52 (see FIG. 2) of the light diffusing member 5. The positioning protrusion 33 is inserted into the groove 52, thereby positioning the light diffusing member 5 with respect to the support member 3.

Note that the configuration of the support member 3 is not limited to the above-described configuration. For example, the support member 3 does not necessarily include at least one of the through-holes 31, the opening portion 32, and the positioning protrusion 33. The support member 3 can have any configuration as long as the support member 3 is transparent and is capable of supporting the sensor member 2 from below.

The light guide member 4 is a transparent member that guides light, emitted from the light emitting members 62, to the side surface of the light diffusing member 5 (in the Y1 direction). The light guide member 4 has a bent or curved plate shape. The material of the light guide member 4 may be, for example, PC, but is not limited thereto. As illustrated in FIG. 7, the light guide member 4 includes an incident portion 41 and a light guide portion 42.

Light emitting from the light emitting members 62 is incident on the incident portion 41. As illustrated in FIG. 3, the incident portion 41 has a bottom surface on which light, emitted from the light emitting members 62, is incident. The incident portion 41 extends from the bottom surface thereof in the Z1 direction and extends further in the Y1 direction. Further, the surface on the Y2 side of the incident portion 41 is curved toward the Y1 side.

The light guide portion 42 guides light, incident on the light guide member 4, to the side surface of the light diffusing member 5. The side surface on the Y1 side of the light guide portion 42 guides light, incident on the light guide member 4, to the side surface of the light diffusing member 5. The light guide portion 42 extends in the Y2 direction from the side surface on the Y1 side. The light guide portion 42 and the light diffusing member 5 are disposed adjacent to each other at the bottom surface of the support member 3.

The upper end of the incident portion 41 is connected to the end on the Y2 side of the light guide portion 42. Accordingly, the light guide member 4 has an approximately L shape in cross section in the YZ plane.

The light guide member 4 is fixed to the bottom surface of the support member 3, such that the light guide member 4 is located under the opening portion 32, the bottom surface of the incident portion 41 is located over the light emitting members 62, and the side surface on the Y1 side of the light guide portion 42 is adjacent to the side surface on the Y2 side of the light diffusing member 5. Accordingly, light emitted from the light emitting members 62 is incident on the bottom surface of the incident portion 41, reaches the side surface on the Y1 side of the light guide portion 42 while being reflected inside the light guide member 4, and is incident from the side surface on the Y1 side of the light guide portion 42 onto the side surface on the Y2 side of the light diffusing member 5. That is, light emitted from the light emitting members 62 is guided to the light diffusing member 5 through the light guide portion 42.

The light guide member 4 may be fixed to the support member 3 by bonding the top surface of the light guide portion 42 to the bottom surface of the support member 3. Alternatively, the light guide member 4 may be fixed to the support member 3 by welding the light guide portion 42 to the support member 3. Alternatively, the light guide member 4 may be integrally formed with the support member 3 by injection molding. In any case, the light guide member 4 and the support member 3 are integrated into a single unit. Because the light guide member 4 is integrated with the support member 3, the number of parts of the switch device 100 can be reduced. In addition, forming the opening portion 32 in the support member 3 allows the light guide portion 42 to be readily bonded or welded to the support member 3. Accordingly, the light guide member 4 can be readily fixed to the support member 3.

Note that the configuration of the light guide member 4 is not limited to the above-described configuration. For example, the light guide member 4 may be formed of a material that is different from the material of the support member 3. The light guide member 4 can have any configuration as long as the light guide member 4 is capable of guiding light, emitted from the light emitting members 62, to the side surface of the light diffusing member 5.

The light diffusing member 5 diffuses light, incident from the side surface of the light diffusing member 5, upward (toward the symbols 121 having the "2", "S", and "EP" shapes). In the example of FIG. 14, the light diffusing member 5 has a substantially rectangular sheet shape or flat plate shape. The light diffusing member 5 has a structure of three layers, namely a transparent upper layer 54, a middle layer 55, and a lower layer 56. The middle layer 55 includes a light diffusing portion 57, and the lower layer 56 reflects light upward. The upper layer 54 is formed of a transparent film. The middle layer 55 is formed of a film printed with a transparent ink. The lower layer 56 is formed of a film printed with a white ink or formed of a reflective film. The light diffusing portion 57 is formed by dot printing with a transparent ink. The light diffusing portion 57 may be microlenses. As illustrated in FIG. 3, the top surface of the light diffusing member 5 is fixed to the bottom surface of the support member 3, such that the side surface on the Y2 side of the light diffusing member 5 is adjacent to the side surface on the Y1 side of the light guide member 4, and the light diffusing member 5 can cover at least the symbols 121 having the "2", "S", and "ET" shapes from below. With this configuration, the light diffusing member 5 can diffuse light, incident from the side surface of the light diffusing member 5, toward the symbols 121 having the "2", "S", and "ET" shapes. For example, the light diffusing member 5 may be bonded to the support member 3 with a transparent adhesive.

As indicated by arrows in FIG. 3, by disposing the light diffusing member 5 as described above, light emitted from the light emitting members 62 is incident on the light guide member 4, enters the middle layer 55 from the side surface of the light diffusing member 5, is guided through the middle layer 55, and is diffused by the light diffusing portion 57. Part of the light is scattered upward and is radiated from the entire top surface of the light diffusing member 5. Further, part of the light is scattered downward and is reflected by the lower layer 56. As a result, the direction of the part of the light is changed, and the part of the light is radiated from the entire top surface of the light diffusing member 5. Light radiated from the top surface of the light diffusing member 5 is transmitted through the transparent support member 3, is transmitted through the transparent symbols 121, and is then radiated to the outside of the operation member 1. In the example of FIG. 1, light emitted from the light emitting members 62 is radiated from the three symbols 121 having the "2", "S", and "ET" shapes. The user can visibly recognize that the three symbols 121, from which the light is radiated, are illuminated. In this manner, according to the present embodiment, the light emitting members 62 disposed under the light guide member 4 (under the bottom surface of the incident portion 41) can illuminate the plurality of (in this example, three) symbols 121.

Further, according to the present embodiment, because the bottom surface of the support member 3 is flat, the light diffusing member 5 having a sheet shape can be held flat.

Accordingly, light can be uniformly radiated from the top surface of the light diffusing member 5. Further, the entirety of the operation member 1, in which the position of the top plate 12 in the Z direction differs between the Y1 side and the Y2 side, can be supported by the support member 3 disposed on the light diffusing member 5. In addition, light radiated from the top surface of the light diffusing member 5 can be transmitted through the support member 3. Accordingly, the plurality of symbols 121 can be uniformly illuminated.

The light diffusing member 5 includes the plurality of through-holes 51, the groove 52, and an opening 53.

The plurality of through-holes 51 are formed at positions corresponding to the plurality of positioning protrusions 122 of the top plate 12, and extend in the Z direction. The positioning protrusions 122 are inserted into the through-holes 51, thereby positioning the light diffusing member 5 with respect to the top plate 12.

The groove 52 is formed in the end portion on the Y1 side of the light diffusing member 5, and extends in the Y direction. The groove 52 is formed at a position corresponding to the positioning protrusion 33 of the support member 3. The positioning protrusion 33 is inserted into the groove 52, thereby positioning the light diffusing member 5 with respect to the support member 3.

The opening 53 is formed so as to surround the sides of the light guide member 4. The light guide member 4 is inserted into the opening 53.

Note that the configuration of the light diffusing member 5 is not limited to the above-described configuration. For example, the light diffusing member 5 does not necessarily include at least one of the through-holes 51, the groove 52, and the opening 53. Further, the light diffusing member 5 may have a structure of one layer, two layers, or four or more layers. The light diffusing member 5 may have any configuration as long as the light diffusing member 5 is capable of diffusing light, incident from the side surface of the light diffusing member 5, upward.

The circuit board 6 is a board equipped with a circuit (not illustrated) for detecting an operation performed by the user on the operation member 1. The circuit board 6 has a substantially rectangular plate shape or sheet shape, and is connected to an external device. The circuit board 6 may be, for example, a printed circuit board, but is not limited thereto. As illustrated in FIG. 3, the circuit board 6 is fixed to the top surface of the movable member 7, and is housed within the operation member 1. As illustrated in FIG. 8 and FIG. 9, the circuit board 6 includes the plurality of through-holes 61, the light emitting members 62, a light emitting member 63, and a push switch 64.

The plurality of through-holes 61 are formed at positions corresponding to the plurality of positioning protrusions 122 of the top plate 12, and extend in the Z direction. As described above, the positioning protrusions 122 are inserted into the through-holes 61, thereby positioning the circuit board 6 with respect to the top plate 12.

The light emitting members 62 and 63 are provided on the top surface of the circuit board 6, and are configured to emit light upward. The light emitting members 62 and 63 emit light according to instructions from the circuit mounted on the circuit board 6. The light emitting members 62 and 63 may be, for example, LEDs, but are not limited thereto.

The light emitting members 62 (an example of a first light emitting member) are configured to illuminate the symbols 121 having the "2", "S", and "ET" shapes. The light emitting members 62 are disposed under the bottom surface of the incident portion 41 of the light guide member 4. As described above, the symbols 121 having the "2", "S", and "ET" shapes are irradiated with light emitted from the light emitting members 62 through the light guide member 4, the light diffusing member 5, and the support member 3. In the example of FIG. 8, the circuit board 6 includes the two light emitting members 62; however, the circuit board 6 may include one light emitting member 62 or three or more light emitting members 62.

The light emitting member 63 (an example of a second light emitting member) is configured to illuminate the symbol 121 having the "1" shape. The light emitting member 63 is disposed under the symbol 121 having the "1" shape. The symbol 121 having the "1" shape is irradiated with light emitted from the light emitting member 63. In the example of FIG. 8, the circuit board 6 includes the one light emitting member 63; however, the circuit board 6 may include two or more light emitting members 63. The light emitting member 63 is disposed on the Y2 side of the circuit board 6 relative to the light emitting members 62.

The push switch 64 is configured to detect a pressing operation on the operation member 1. The push switch 64 is provided on the bottom surface of the circuit board 6. The push switch 64 may be, for example, a tactile switch or a TACT switch (registered trademark), but is not limited thereto.

Note that the configuration of the circuit board 6 is not limited to the above-described configuration. For example, the circuit board 6 does not necessarily include the light emitting member 63 if the light emitting members 62 can illuminate all the symbols 121. The circuit board 6 can have any configuration as long as the circuit board 6 includes light emitting member(s) 62 and is capable of detecting an operation of the user on the operation member 1.

The movable member 7 is movable in the Z direction upon the operation member 1 being pressed. The material of the movable member 7 may be, for example, polyoxymethylene (POM), but is not limited thereto. As illustrated in FIG. 2, the movable member 7 has an approximately rectangular plate shape, and is disposed between the circuit board 6 and the fixing member 9.

As illustrated in FIG. 3, the circuit board 6 is fixed to the top surface of the movable member 7, and the side plate 11 of the operation member 1 is fixed to the side surfaces of the movable member 7. Accordingly, the bottom of the operation member 1 is closed by the movable member 7, and a space surrounded by the operation member 1 and the movable member 7 is formed. The sensor member 2, the support member 3, the light guide member 4, the light diffusing member 5, and the circuit board 6 are housed in the space. Upon the operation member 1 being pressed, the operation member 1, the sensor member 2, the support member 3, the light guide member 4, the light diffusing member 5, the circuit board 6, and the movable member 7 move together in the Z direction. As illustrated in FIG. 10 and FIG. 11, the movable member 7 includes the plurality of projections 71, the plurality of grooves 72, an opening 73, a plurality of leg portions 74, a plurality of stoppers 75, and a pair of holding portions 76.

The plurality of projections 71 project from the side surface of the movable member 7. The plurality of projections 71 are formed at positions corresponding to the plurality of fitting portions 111 of the operation member 1. The projections 71 are fitted into the center portions of the respective fitting portions 111, thereby fixing the movable member 7 to the operation member 1.

The plurality of grooves 72 are formed in the side surfaces of the movable member 7, and extend inward. The plurality of grooves 72 are formed at positions corresponding to the plurality of positioning protrusions 112 of the operation member 1. The positioning protrusions 112 are inserted into the respective grooves 72, thereby positioning the movable member 7 with respect to the operation member 1.

The opening 73 is formed so as to surround the sides of the push switch 64. The push switch 64 is inserted into the opening 73.

The plurality of leg portions 74 guide the movement of the movable member 7 in the Z direction. The plurality of leg portions 74 are formed at positions corresponding to a plurality of guide portions 91 (see FIG. 12) of the fixing member 9. The leg portions 74 are projections that project from the bottom surface of the movable member 7, and have grooves into which the respective guide portions 91 are inserted. By inserting the guide portions 91 into the leg portions 74, the inclination of the movable member 7 with respect to the fixing member 9 in the X direction and the Y direction can be reduced. Accordingly, the orientation of the movable member 7 can be maintained while the movable member 7 is moved in the Z direction.

The plurality of stoppers 75 prevent the movable member 7 from slipping upward from the fixing member 9. The plurality of stoppers 75 are formed at positions corresponding to a plurality of projections 92 (see FIG. 13) of the fixing member 9. The stoppers 75 are projections that project from the bottom surface of the movable member 7, and have openings 751 in the center portions of the stoppers 75. The projections 92 are inserted into the openings 751. The lower ends of the projections 92 inserted into the openings 751 contact the lower ends of the openings 751, thereby preventing the movable member 7 from slipping upward from the fixing member 9.

The pair of holding portions 76 holds the elastic member 8. The holding portions 76 are formed on the Y1 side and the Y2 side of the movable member 7. The holding portions 76 are projections that project from the bottom surface of the movable member 7. The holding portions 76 have fitting portions 761 at the lower sides thereof, and the elastic member 8 is fitted into the fitting portions 761. The elastic member 8 is held by the movable member 7 by being fitted into the fitting portions 761.

Note that the configuration of the movable member 7 is not limited to the above-described configuration. The movable member 7 does not necessarily include at least one of the projections 71, the grooves 72, the opening 73, the leg portions 74, the stoppers 75, and the holding portions 76. The movable member 7 can have any configuration as long as the movable member 7 is movable in the Z direction upon the operation member 1 being pressed.

The elastic member 8 preloads the movable member 7 upward against the fixing member 9. The material of the elastic member 8 may be, for example, a metal, but is not limited thereto. As illustrated in FIG. 2, the elastic member 8 includes both end portions, a central portion, and connecting portions. The both end portions extend in the Y direction, and the connecting portions extend in the X direction and connect the central portion to the both end portions. The central portion of the elastic member 8 is held by holding portions 94 (see FIG. 1) of the fixing member 9, and the both end portions of the elastic member 8 are held by the holding portions 76 (see FIG. 3) of the movable member 7. With the above configuration, the elastic member 8 functions as a torsion bar, and preloads the movable member 7 upward against the fixing member 9.

Note that the configuration of the elastic member 8 is not limited to the above-described configuration. The elastic member 8 may be, for example, a compression coil spring. The elastic member 8 may have any configuration as long as the elastic member 8 is capable of preloading the fixing member 9 upward against the movable member 7.

The fixing member 9 supports the movable member 7 such that the movable member 7 is movable in the Z direction. The switch device 100 is fixed to an external device by fixing the fixing member 9 to the external device. The fixing member 9 has an approximately rectangular parallelepiped shape that has an opening in the Z direction. As illustrated in FIG. 2, the fixing member 9 is disposed under the movable member 7. The operation member 1, the sensor member 2, the support member 3, the light guide member 4, the light diffusing member 5, the circuit board 6, and the movable member 7 move relative to the fixing member 9 in the Z direction. As illustrated in FIG. 12 and FIG. 13, the fixing member 9 includes the plurality of guide portions 91, the plurality of projections 92, a pressing portion 93, and the pair of holding portions 94.

The guide portions 91 guide the movement of the movable member 7 in the Z direction. The plurality of guide portions 91 are formed at positions corresponding to the plurality of leg portions 74 of the movable member 7. The guide portions 91 are projections that project from the side surfaces of the fixing member 9, and are inserted into the respective leg portions 74. By inserting the guide portions 91 into the leg portions 74, the inclination of the movable member 7 with respect to the fixing member 9 in the X direction and the Y direction can be reduced. Accordingly, the orientation of the movable member 7 can be maintained while the movable member 7 is moved in the Z direction.

The projections 92 prevent the movable member 7 from slipping upward from the fixing member 9. The plurality of projections 92 are formed at positions corresponding to the plurality of stoppers 75 of the movable member 7. As illustrated in FIG. 13, the projections 92 project from the side surface on the X2 side of the fixing member 9. As illustrated in FIG. 13, each of the projections 92 projects more on the Z2 side than on the Z1 side. Accordingly, the projections 92 can be readily inserted into the openings 751. The lower ends of the projections 92 inserted into the openings 751 contact the lower ends of the openings 751, thereby preventing the movable member 7 from slipping upward from the fixing member 9.

The pressing portion 93 presses the push switch 64. As illustrated in FIG. 12, the pressing portion 93 is a projection that projects from the top surface of the fixing member 9, and is formed at a position corresponding to the push switch 64 (see FIG. 3). Upon a pressing operation being performed on the operation member 1, the circuit board 6 moves down, and the push switch 64 is pressed by the pressing portion 93. Accordingly, the circuit board 6 can detect the pressing operation performed on the operation member 1.

The pair of holding portions 94 holds the elastic member 8. The holding portions 94 are formed on the Y1 side and the Y2 side of the fixing member 9. The holding portions 94 are projections that project from the side surface on the X1 side of the fixing member 9. The elastic member 8 is held by the fixing member 9 by being fitted into the holding portions 94.

Note that the configuration of the fixing member 9 is not limited to the above-described configuration. For example, the fixing member 9 does not necessarily include at least one of the guide portions 91, the projections 92, the pressing portion 93, and the holding portions 94. The fixing member 9 can have any configuration as long as the fixing member 9 is capable of supporting the movable member 7 such that the movable member 7 is movable in the Z direction.

Next, the operation of the switch device 100 according to the present embodiment will be described. In the following, an example of the operation of the switch device 100, when an operation corresponding to the symbol 121 having the "ET" shape (hereinafter referred to as a "symbol ET") is performed by a user, will be described.

When the switch device 100 is not being operated, the push switch 64 is in an off state because the movable member 7 is pushed upward by the elastic member 8. Further, because the user is not in contact with the operation member 1 (top plate 12), the sensor member 2 does not detect any user contact.

Upon the user contacting the symbol ET, the sensor member 2 detects the contact position of the user, and inputs the detected result (contact position) into the circuit board 6. Upon the detected result being input, the circuit board 6 identifies the symbol 121 (symbol ET) contacted by the user based on the detected result. In this manner, the user's contact on the symbol ET can be detected.

When the user performs a pressing operation on the operation member 1 while contacting the symbol ET, the movable member 7 moves down together with the operation member 1. Upon the movable member 7 moving down, the push switch 64 provided on the bottom surface of the movable member 7 is pressed by the pressing portion 93 and is turned on. Accordingly, the circuit board 6 can detect the pressing operation performed on the operation member 1.

Upon detecting the pressing operation, the circuit board 6 outputs a control signal for performing an operation corresponding to the symbol ET. The control signal, output from the circuit board 6, is input into an external device. Upon receiving the control signal, the external device performs the operation in accordance with the control signal.

Subsequently, when the user's pressing operation is completed and the user's finger moves away from (is released from) the symbol ET, the movable member 7 preloaded by the elastic member 8 moves up, thus causing the push switch 64 to be turned off. In this state, the user is not in contact with the operation member 1 (top plate 12), and thus, the sensor member 2 does not detect any user contact. Accordingly, the switch device 100 returns to a non-operating state.

In the switch device 100, the positional relationship between the sensor member 2, the support member 3, the light guide member 4, the light diffusing member 5, and the circuit board 6 is fixed. Therefore, regardless of whether an operation is performed, the switch device 100 can cause the symbols 121 having the "2", "S", and "ET" shapes to be illuminated by light emitted from the light emitting members 62, and cause the symbol 121 having the "1" shape to be illuminated by light emitted from the light emitting member 63.

As described above, according to the present embodiment, the switch device 100 can display the symbols 121, provided on the surface (top plate 12) of the operation member 1 and corresponding to respective operations, in an easily viewable manner, by illuminating the symbols 121.

Further, according to the present embodiment, light emitted from the light emitting members 62, disposed under the light guide member 4 (incident portion 41) can illuminate the plurality of symbols 121. Accordingly, as compared to when a light emitting member is provided for each symbol 121, the number of light emitting members 62 can be reduced, thus allowing the cost of manufacturing the switch device 100 to be reduced.

Further, according to the present embodiment, because light is diffused by the light diffusing member 5, the symbols 121 can be uniformly illuminated. Accordingly, the distance between a light emitting member 62 and a symbol 121, which is required to uniformly illuminate the symbol 121, can be reduced. For example, in the example of FIG. 15, the distance L1 between a light emitting member 62 (a dash line drawn from the lower edge of the incident portion 41) and any of the symbols 121 having the "1", "2, and "S" shapes corresponds to the sum of the height of the incident portion 41, the thickness on the Y2 side of the support member 3, and the thickness of the light diffusing member 5. Further, the distance L2 between a light emitting member 62 (the dash line drawn from the lower edge of the incident portion 41) and the symbol 121 having the "ET" shape corresponds to the sum of the height of the incident portion 41, the thickness on the Y1 side of the support member 3, and the thickness of the light diffusing member 5. Accordingly, the thickness of the switch device 100 according to the present embodiment can be reduced as compared to when light is directly emitted from a light emitting member 62 to a symbol 121.

Further, according to the present embodiment, top-view LEDs, having optical axes perpendicular to the circuit board 6, can be used as the light emitting members 62 and 63. A top-view LED is less expensive than a side-view LED having an optical axis parallel to the circuit board 6. Thus, the cost of manufacturing the switch device 100 can be reduced. Note that there may be a case where the optical axes of the light emitting members 62 and 63 are not perpendicular to the circuit board 6 due to an installation error. The optical axes of the light emitting members 62 and 63 are not necessarily perpendicular to the circuit board 6, and may be inclined with respect to the circuit board 6 at an angle of 80 degrees or more. The light emitting members 62 and 63 may be side-view LEDs as long as there is no inconsistency with the light guide paths of the light guide member 4 and the light diffusing member 5.

Further, according to the present embodiment, the top surface of the support member 3 is shaped to conform to the bottom surface of the operation member 1. Accordingly, the sheet-shaped sensor member 2 can be held in contact with the bottom surface of the top plate 12, and the detection accuracy of the sensor member 2 can be thus improved. Further, regardless of the shape of the operation member 1, the sheet-shaped sensor member 2 can be held in contact with the bottom surface of the top plate 12. Therefore, the degree of freedom in design of the operation member 1 can be enhanced. In other words, the step 123 can be provided on the top plate 12 without decreasing the detection accuracy of the sensor member 2. Accordingly, the decorative appearance of the top plate 12 can be improved.

The present invention is not limited to the configurations of the above-described embodiments, and combinations with other elements may be made. In this respect, modifications may be made without departing from the scope of the present invention, and the modifications may be appropriately determined according to applications of the present invention.

What is claimed is:

1. An illuminating device comprising:
   a circuit board having a top surface;
   a first light, emitting member disposed on the top surface of the circuit board to emit light;
   a housing having a bottom surface, disposed to cover the circuit board from above, and having a symbol, the symbol being configured to be illuminated by the light;
   a support member disposed under the housing, the support member being transparent and having a first surface and a second surface, the first surface being shaped to follow to the bottom surface of the housing and the second surface being flat;
   a light diffusing member having a side surface that receives the light, the light diffusing member being fixed to the second surface of the support member and configured to diffuse the light toward the symbol; and
   a light guide member configured to guide the light, emitted from the first light emitting member, to the side surface of the light diffusing member.

2. The illuminating device according to claim 1, wherein the light guide member is integrated with the support member.

3. The illuminating device according to claim 1, wherein the support member has an opening portion over the light guide member.

4. The illuminating device according to claim 1, wherein the first surface of the support member has a stepped shape.

5. The illuminating device according to claim 1, wherein the light diffusing member has a sheet shape or a flat plate shape.

6. The illuminating device according to claim 1, wherein at least a part of the light guide member and the light diffusing member are disposed adjacent to each other at the second surface of the support member.

7. The illuminating device according to claim 1, further comprising, a sensor member having a sheet shape and disposed between the housing and the support member.

8. The illuminating device according to claim 1, wherein the light is incident from below, and the light guide member is configured to guide the light to the side surface of the light diffusing member.

9. The illuminating device according to claim 1, further comprising a second light emitting member,
   wherein the light guide member is, configured to guide the light, emitted from the first light emitting member, toward one side of the circuit board, and
   the second light emitting member is disposed on an opposite side of the circuit board from the one side.

10. An input device comprising,
    the illuminating device according to claim 1.

* * * * *